United States Patent
Kim et al.

(10) Patent No.: US 10,757,433 B2
(45) Date of Patent: Aug. 25, 2020

(54) METHOD AND APPARATUS FOR INSERTING ADDITIONAL DATA INTO VIDEO STREAM WITHOUT DEGRADING PICTURE QUALITY

(71) Applicant: MARKANY INC., Seoul (KR)

(72) Inventors: So Won Kim, Seoul (KR); Min Soo Park, Uiwang-si (KR); Ji Seop Moon, Seoul (KR); Kun Tae Kim, Seoul (KR); Euee Seon Jang, Seoul (KR)

(73) Assignee: MARKANY INC., Seoul (KR)

( * ) Notice: Subject to any disclaimer, the term of this patent is extended or adjusted under 35 U.S.C. 154(b) by 953 days.

(21) Appl. No.: 15/156,293

(22) Filed: May 16, 2016

(65) Prior Publication Data

US 2017/0201764 A1 Jul. 13, 2017

(30) Foreign Application Priority Data

Jan. 7, 2016 (KR) ........................ 10-2016-0002257

(51) Int. Cl.
| | |
|---|---|
| *H04N 19/467* | (2014.01) |
| *H04N 19/577* | (2014.01) |
| *H04N 19/13* | (2014.01) |
| *H04N 19/52* | (2014.01) |
| *H04N 19/124* | (2014.01) |

(Continued)

(52) U.S. Cl.
CPC ......... *H04N 19/467* (2014.11); *H04N 19/124* (2014.11); *H04N 19/13* (2014.11); *H04N 19/52* (2014.11); *H04N 19/577* (2014.11); *H04N 19/593* (2014.11); *H04N 19/61* (2014.11)

(58) Field of Classification Search
CPC .... H04N 19/124; H04N 19/13; H04N 19/467; H04N 19/52; H04N 19/577; H04N 19/593; H04N 19/61
See application file for complete search history.

(56) References Cited

U.S. PATENT DOCUMENTS 7,738,676 B1 * 6/2010 Evans ................... G06T 1/0035
382/100
2002/0159755 A1 10/2002 Kuroda
(Continued)

FOREIGN PATENT DOCUMENTS

| JP | 2002330434 A | 11/2002 |
|---|---|---|
| KR | 1020050112634 A | 12/2005 |

(Continued)

*Primary Examiner* — Jamie J Atala
*Assistant Examiner* — Joon Kwon
(74) *Attorney, Agent, or Firm* — Invenstone Patent, LLC

(57) ABSTRACT

A method of inserting additional data into a moving image stream, according to some embodiments of the present invention, includes receiving a first coded bitstream, electing a first picture PA into which additional data is to be inserted from the first coded bitstream, generating a first picture PA' by inserting the additional data into the selected first picture PA, selecting a second picture PB directly referring to the first picture PA, generating a second picture PB' by transforming and coding the selected second picture PB in a manner that decoding the second picture PB' obtains the second picture PB with reference to the first picture PA' and generating a data sequence based on the first picture PA' and the second picture PB.

20 Claims, 11 Drawing Sheets

(51) Int. Cl.
*H04N 19/61* (2014.01)
*H04N 19/593* (2014.01)

(56) References Cited

U.S. PATENT DOCUMENTS

| | | | |
|---|---|---|---|
| 2004/0187005 A1* | 9/2004 | Molaro | G06F 21/10 |
| | | | 713/176 |
| 2004/0228409 A1* | 11/2004 | Ryou | H04N 19/196 |
| | | | 375/240.12 |
| 2005/0265576 A1 | 12/2005 | Seong et al. | |
| 2014/0105295 A1* | 4/2014 | Shiodera | H04N 19/52 |
| | | | 375/240.14 |
| 2014/0355665 A1* | 12/2014 | Wegener | H04N 19/127 |
| | | | 375/240.02 |

FOREIGN PATENT DOCUMENTS

| KR | 1020120045131 A | 5/2012 |
|---|---|---|
| KR | 1020120045132 A | 5/2012 |

* cited by examiner

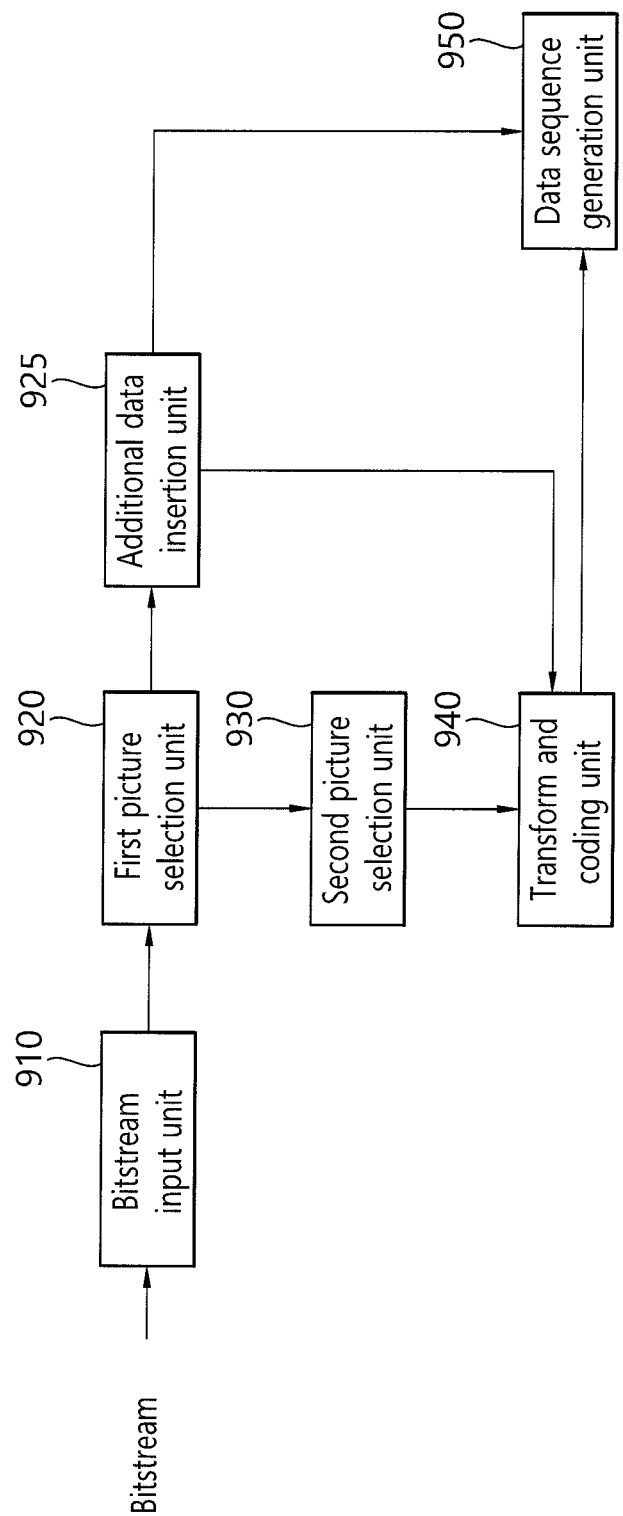

METHOD AND APPARATUS FOR INSERTING ADDITIONAL DATA INTO VIDEO STREAM WITHOUT DEGRADING PICTURE QUALITY

CROSS-REFERENCE TO RELATED APPLICATIONS

This application is based upon and claims the benefit of priority from Korean Patent Application No. 10-2016-0002257, filed Jan. 7, 2016, the entire contents of which are incorporated herein by reference.

BACKGROUND OF THE INVENTION

1. Field of the Invention

The present invention relates to a method and an apparatus for inserting additional data, and more particularly, to a method and an apparatus for inserting additional data, such as a watermark, into a Moving Picture Expert Group (MPEG) bitstream without causing excessive coding and degradation of picture quality

2. Description of the Related Art

As the digital technology is advanced, a lot of digital multimedia data has become easily available. Unlike analog information, digital information can be mass-produced at low cost without degrading data quality. Such a characteristic of digital information may become problematic from the point of view of copyright protection. One of technologies for solving the copyright problem of such digital contents employs an insertion of additional data, such as a watermark, into a coded video stream.

Such an additional data insertion scheme is a technology for preventing illegal copy and protecting the copyright of the digital contents by inserting data, such as a user identification (ID) or user information, into the digital contents.

If such additional data is inserted into video data, however, the following problem may occur. In a moving image codec technology, such as High Efficiency Video Coding (HEVC), when coding is performed, coding efficiency is improved using inter-prediction in which reference is made to a previously coded picture or slice. In this case, there is a burden of coding pictures, which refer a picture or slice into which additional data has been inserted, again in series. In particular, such a problem may cause a bigger problem when additional data is inserted after coding is already completed.

FIG. 1 is a schematic diagram for illustrating a method of processing a bitstream with an insertion of additional data when coding a video.

In the example shown in FIG. 1, a bitstream 100 includes an Intra-coded (I) frame, a Predictive-coded (P) picture on which uni-directional inter-prediction is performed, and a Bidirectional-coded (B) picture on which bidirectional inter-prediction is performed.

The bitstream 100 includes a picture A (PA) 110 that is a target into which additional data is to be inserted, a picture B (PB) 120 that refers to the PA 110, and a picture C (PC) 130 other than the PA 110 and the PB 120. In this case, if the additional data is inserted into the PA 110, a decoder that receives the PA 110 is unable to clearly decode the PA 110 with a common decoding. That is, when decoding is performed with the common decoding, picture quality is degraded. Furthermore, the picture qualities of the PB 120 and the PC 130 that refer to the PA 110 directly or indirectly are also degraded. In other words, the PB 120 referring to the PA 110 needs to refer to a picture A' (PA') into which additional data has been inserted and needs to be coded again. Whole or a part of the PC 130 that refers to a newly coded PB also needs to be coded again. Accordingly, there are problems in that the coding efficiency is degraded due to repeated codings and there is a big burden in executing the video coding operation due to the insertion of additional data.

SUMMARY OF THE INVENTION

A method of inserting additional data into a moving image stream, according to some embodiments of the present invention, includes receiving a first coded bitstream, electing a first picture PA into which additional data is to be inserted from the first coded bitstream, generating a first picture PA' by inserting the additional data into the selected first picture PA, selecting a second picture PB directly referring to the first picture PA, generating a second picture PB' by transforming and coding the selected second picture PB in a manner that decoding the second picture PB' obtains the second picture PB with reference to the first picture PA' and generating a data sequence based on the first picture PA' and the second picture PB. The generating the second picture PB' may include generating the second picture PB' based on the first picture PA' and the first picture PA.

The third picture PC other than the first picture PA and the second picture PB in the bitstream may be free of a separate coding from the insertion of the additional data into the first picture PA.

The second picture PB may comprise a B frame or a P frame, directly referring to the first picture PA.

The additional data may comprise a watermark data.

The generating the second picture PB' may be performed based on a lossless coding scheme.

The generating the second picture PB' may be performed with a weighted prediction off.

The generating the second picture PB' may further include coding a first frame of the second picture PB' into an I frame.

m types of the second picture PB' may correspond to the first picture PA' into which n types of additional data differently generated depending on types of inserted additional data have been inserted, where m and n are natural numbers equal to or different from each other.

When the second picture PB' is transformed and coded based on a lossless scheme, the second picture PB' may be allowed to refer to the first picture PA', and when the second picture PB' is coded based on an intra-coding scheme, the first picture PA' into which the n types of additional data have been inserted may correspond to one of the n types of the second picture PB'.

An apparatus for inserting additional data into a moving image stream, according to some embodiments of the present invention, includes a bitstream input unit configured to receive a first coded bitstream, a first picture selection unit configured to select a first picture PA into which additional data is to be inserted from the first coded bitstream, an additional data insertion unit configured to generate a first picture PA' by inserting the additional data into the selected first picture PA, a second picture selection unit configured to select a second picture PB directly referring to the first picture PA, a transform and coding unit configured to generate a second picture PB' by transforming and coding the selected second picture PB in a manner that decoding the second picture PB' obtains the second picture PB with reference to the first picture PA and a data sequence generation unit configured to generate a data sequence based on the first picture PA' and the second picture PB'.

The transform and coding unit may generate the second picture PB' includes generating the second picture PB' based on the first picture PA' and the first picture PA.

The third picture PC other than the first picture PA and the second picture PB in the bitstream may be free of a separate coding from the insertion of the additional data into the first picture PA.

The second picture PB may comprise a B frame or a P frame, directly referring to the first picture PA.

The additional data may comprise a watermark data.

The transform and coding unit may be performed based on a lossless coding scheme.

The second picture PB' may be generated with a weighted prediction off.

The transform and coding unit may code a first frame of the second picture PB' into an I frame.

m types of the second picture PB' may correspond to the first picture PA' into which n types of additional data differently generated depending on types of inserted additional data have been inserted, where m and n are natural numbers equal to or different from each other.

When the second picture PB' is transformed and coded based on a lossless scheme, the second picture PB' may be allowed to refer to the first picture PA', and when the second picture PB' is coded based on an intra-coding scheme, the first picture PA' into which the n types of additional data have been inserted may correspond to one of the n types of the second picture PB'.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a schematic block diagram showing an apparatus for inserting additional data according to an embodiment of the present invention.

DETAILED DESCRIPTION OF THE PREFERRED EMBODIMENTS

Figure 1:
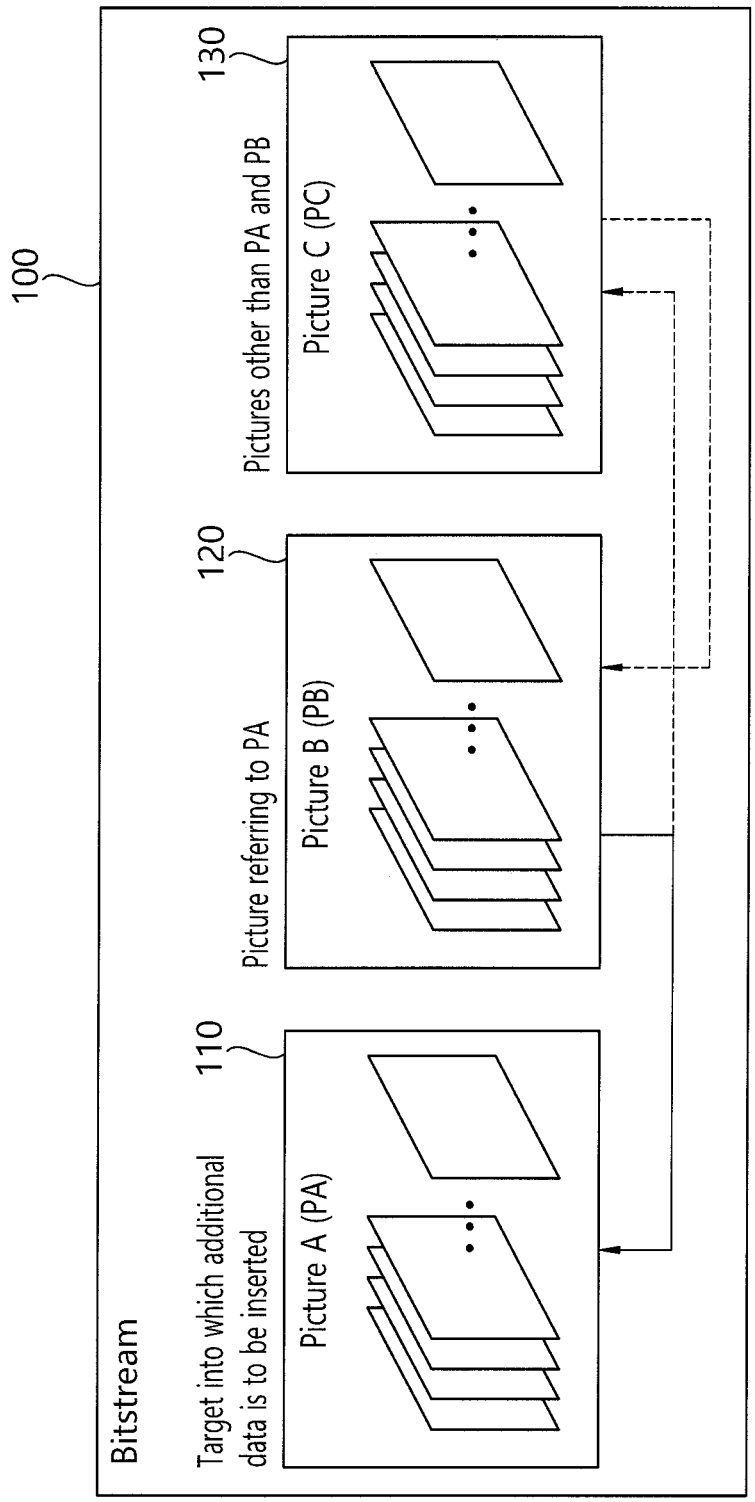
FIG. 1 is a schematic diagram for illustrating a method of processing a bitstream with an insertion of additional data when video is coded.

The present invention may be modified in various ways and may be implemented to have several embodiments. Specific embodiments are illustrated in the drawings and are described in detail.

It is however to be understood that the present invention is not intended to be limited to the specific embodiments and the present invention includes all transforms, equivalents, and substitutions which fall within the spirit and technical scope of the present invention.

Terms, such as the first and the second, may be used to describe various elements, but the elements should not be restricted by the terms. The terms are used to only distinguish one element from the other element. For example, a first element may be named a second element without departing from the scope of the present invention. Likewise, a second element may be named a first element. The term "and/or" includes a combination of a plurality of related and illustrated items or any one of a plurality of related and described items.

When it is said that one element is "connected" or "coupled" to the other element, it should be understood that one element may be directly connected or coupled" to the other element, but a third element may exist between the two elements. In contrast, when it is described that one element is "directly connected" or "directly coupled" to the other element, it should be understood that a third element does not exist between the two elements.

The terms used in this application are used to only describe specific embodiments and are not intended to restrict the present invention. An expression of the singular number includes an expression of the plural number unless clearly defined otherwise in the context. In this application, terms, such as "comprise" or "have", are intended to designate that characteristics, numbers, steps, operations, elements, or parts which are described in the specification, or a combination of them exist, and should not be understood that they exclude the existence or possible addition of one or more other characteristics, numbers, steps, operations, elements, parts, or combinations of them in advance.

Unless defined otherwise, all terms used herein, including technical terms or scientific terms, have the same meanings as those generally understood by persons of ordinary skill in the technical field to which the present invention pertains. The terms, such as terms that are generally used and defined in dictionaries, should be construed as having meanings identical to those that are used in the context of related technology, and should not be construed as having ideal or excessively formal meanings unless explicitly defined otherwise.

Exemplary embodiments of the present invention are described in detail below with reference to the accompanying drawings. In describing the present invention, in order to help general understanding, the same reference numerals are used to denote the same elements throughout the drawings, and a redundant description of the same elements is omitted.

An object of some embodiments of the present invention is to provide a method and an apparatus for inserting additional data, which are capable of improving without degrading the coding efficiency and the picture quality.

Figure 2:
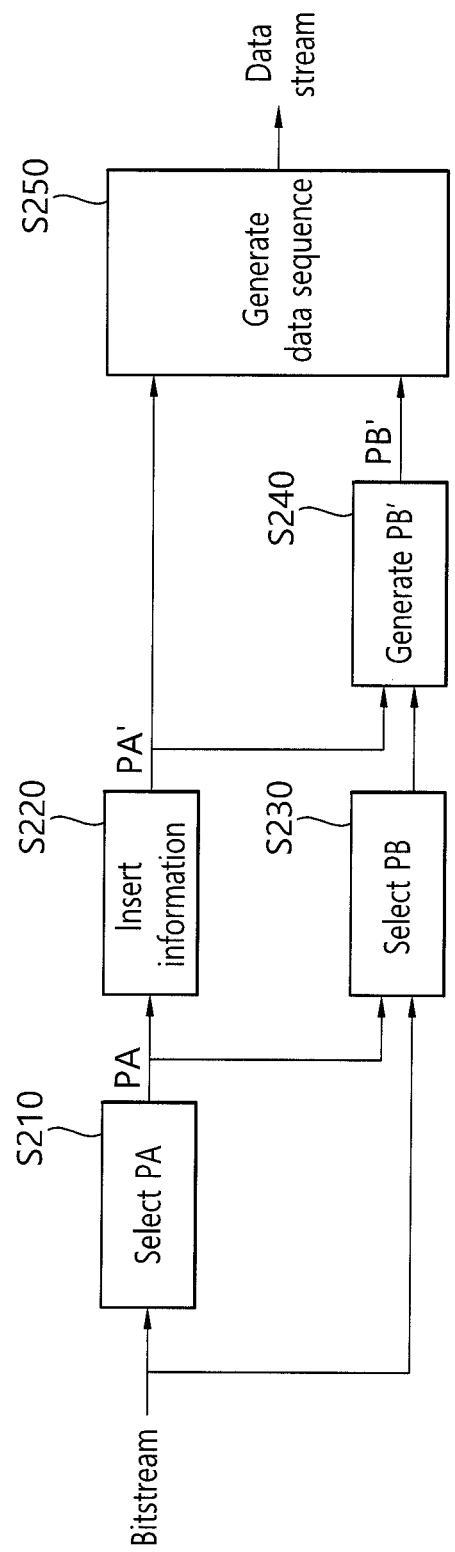
FIG. 2 is a flowchart illustrating a method of inserting additional data into a moving image stream according to some embodiments of the present invention.

FIG. 2 is a flowchart illustrating a method for inserting additional data according to an embodiment of the present invention.

Referring to FIG. 2, first, an apparatus for inserting additional data (not shown) receive bitstream data into which information will be inserted. The bitstream data may be data prior to coding or may be already coded data. If the bitstream data is already coded data, when additional data is inserted into the coded data, an encoder may re-encode the coded data in order for a decoder to decode the coded data without damage to picture quality. The reason for this is that if a bitstream into which additional data has been inserted is to be transmitted without re-encoding the bitstream, damage to picture quality is generated in PA pictures due to the direct insertion of the additional data and damage to picture quality is also continuously generated in PB and PC pictures referring to the PA pictures directly and indirectly because the PB and PC pictures refer to the PA pictures in which damage to picture quality has been generated. In order to prevent such picture quality, pictures into which additional data has been directly inserted may be re-encoded after the additional data is inserted. Furthermore, in coding other pictures, only minimum pictures may be re-encoded. To this end, re-encoding may be performed using the following method. In this specification, a picture may be interchangeably used with a slice or a frame. In the specification of the present invention, the expression of a PA, PB, or PC picture or PA, PB, or PC pictures may be indicative of a single picture, slice, or frame or may be indicative of at least one of a picture group or set, a slice group or set, and a frame group or set including two or more pictures.

In accordance with an embodiment of the present invention, bitstream data inputted for re-encoding in order to prevent damage to picture quality may be inputted in a Group of Picture (GOP) unit. A GOP is a set of images including at least one picture of an Intra-coded frame (I frame). The GOP may be used as a picture edit unit, and such pictures may be combined in a specific pattern. The GOP may include an I frame decoded without reference to other pictures through intra-prediction and a P frame and B frame decoded with reference to other pictures including the I frame. In this case, the P frame may be a frame referring to a unidirectional picture, and the B frame may be a frame referring to a bidirectional picture.

When receiving the bitstream, the apparatus for inserting additional data selects a PA picture, that is, a target into which additional data will be inserted, from the bitstream at step S210. In this case, the additional data may include a watermark, a user ID, copyright-related information, or other encryption data. When the PA picture is selected, the apparatus for inserting additional data inserts information into the PA picture at step S220. The insertion of the information may be performed by properly inserting the additional data (it may be a digital form), such as a watermark, into a specific position within a picture or slice, which is selected by a user. The picture into which the information has been inserted may become a PA' picture.

After selecting the PA picture, the apparatus for inserting additional data selects a PB picture, directly referring to the PA picture, from the bitstream at step S230. In this case, the PB picture may include a B frame in addition to a P frame. In the case of the B frame, one piece of reference may be the PA picture, and the other piece of reference may be a PC picture (i.e., a picture other than the PA and PB pictures). In both cases, if the PA picture is included in at least one direct reference picture, the PB picture may be selected. The B frame may refer to the PC picture other than pictures included in the PA picture.

The apparatus for inserting additional data generates a transformed and coded PB' picture, having a decoding result value at which the PB picture can be output, with reference to the PA' picture into which the additional data has been inserted from the selected PB picture at step S240. That is, a reference picture is the PA' picture, and a decoding result value of the PA' picture needs to be the original PB picture value. Accordingly, the apparatus for inserting additional data may generate the transformed and coded PB' picture using a coding scheme, such as H.265 (HEVC), H.264 and/or H.263, using the reference picture and the result decoding value. In accordance with an embodiment of the present invention, the apparatus for inserting additional data may generate the transformed and coded PB' picture based on the PA' picture into which the additional data (e.g., a watermark) has been inserted and the original PA picture using the selected PB pictures according to a lossless method. Alternatively, transforming and coding may be performed in the state in which weighted prediction mode is off. Furthermore, in accordance with another embodiment of the present invention, the apparatus for inserting additional data may encode the first picture of pictures, selected as the PB picture, into an I frame, may change the reference relationship between subsequent pictures, and may perform coding by changing the reference relationship in such a manner that reference is newly made to the coded I frame without reference to the PA or PA' picture.

The generated PB' picture can offset the additional coding of all of other pictures within the bitstream other than the PA picture, that is, a target into which the additional data will be inserted, and the PB picture. The generated PB' picture may also be called a damage prevention picture because it can prevent damage to picture quality attributable to the coding of information inserted into the PA picture.

After obtaining the PA' picture into which the additional data has been inserted and the transformed and coded PB' picture, the encoder sends the data stream of the PC picture without a special replacement because damage to picture quality is not generated in the remaining PC pictures although the decoder decodes the data stream with reference to the PB' picture. That is, a separate task may not be required. Accordingly, the apparatus for inserting additional data may generate a data sequence by collecting the re-encoded PA' and PB' pictures at step S250. If data is to be generally replaced, only the newly coded PA' picture and PB' picture sequence in the original bitstream is changed.

Figure 3A:
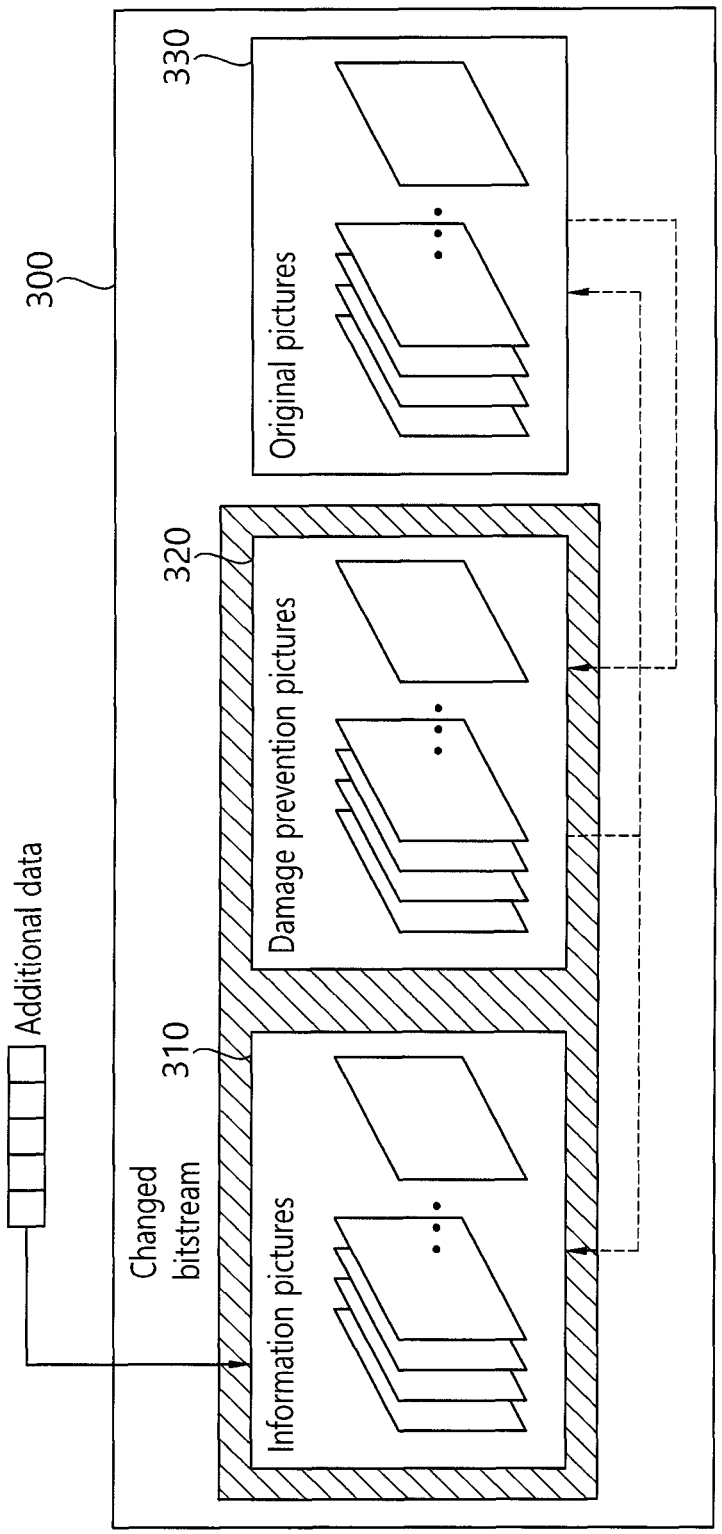
FIG. 3A is a schematic diagram illustrating a method for processing a bitstream changed according to a method for inserting additional data according to an embodiment of the present invention.

FIG. 3A is a schematic diagram illustrating a method for processing a bitstream changed according to a method for inserting additional data according to an embodiment of the present invention.

Referring to FIG. 3A, information pictures 310 are the aforementioned PA picture. The information pictures 310 into which additional data has been inserted may become a PA' picture and may be stored in a frame buffer (not shown). Furthermore, damage prevention pictures 320 may refer to or may not refer to the PA' picture. For example, if the damage prevention picture 320 is coded into an I frame or if a B or P frame is not inter-coded, but is intra-coded, the damage prevention picture 320 may not refer to the PA' picture. If the damage prevention pictures are inter-coded, they may refer to the information pictures 310. A B frame of the damage prevention pictures 320 may refer to the PA picture in such a manner that it refers to the PA' picture and may refer to the original picture with respect to the original pictures 330 that have not been changed.

If only the information pictures 310 and the damage prevention pictures 320 indicated by a deviant crease line in the entire bitstream are changed, separate processing according to the insertion of additional data may not be required. Accordingly, there advantages in terms of coding efficiency and the utilization of additional data.

Figure 3B:
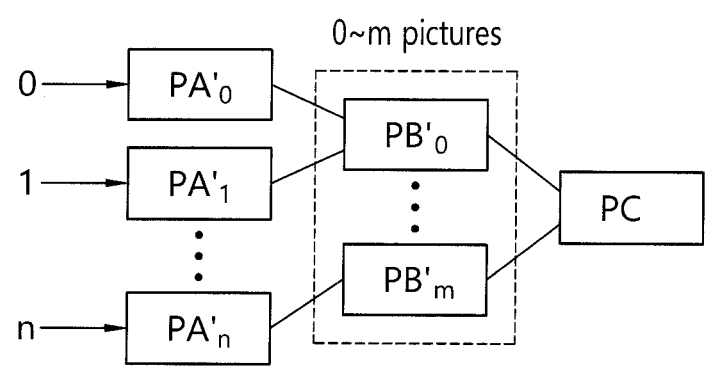
FIG. 3B is a schematic diagram illustrating a reference relationship between a PA' picture and a PB' picture including different additional data.

FIG. 3B is a schematic diagram illustrating a reference relationship between a PA' picture and a PB' picture including different additional data.

Referring to FIG. 3B, the PA' picture may become PA0', PA1' to PAn' pictures depending on added information (e.g., 0 to n, wherein n may be a natural number). The PA0', PA1' to PAn' pictures generated as described above may become a single picture or may be a picture group including a plurality of pictures. The generated PA0', PA1' to PAn' pictures including additional data may not necessarily correspond to the same number of PB pictures in the relationship with the PB pictures, that is, damage prevention pictures. For example, a PB0 picture may refer to both a PA0' picture into which additional data of 0 has been inserted and a PA1' picture into which additional data of 1 has been inserted. Such a reference relationship is not necessarily limited to two and is not necessarily limited to a 1:1 correspondence relation. That is, such a reference relationship may have 1 to many reference relationships. In particular, in the case of lossless coding, a single PB picture may refer to a plurality of PA' pictures (e.g., PA0' to PAn').

In this case, the selection of a PB picture that requires transforming and coding may be affected depending on the type of data added to a PA picture. 0~m (m may be a natural number and may be a value different from n) damage prevention PB pictures may be selected and modified and coded in accordance with PA' pictures according to the type of 0~n additional data. In other words, the PB pictures of damage prevention pictures having the same amount of data added to the PA picture do not need to be selected. In this case, a PC picture does not require additional transforming and coding, but may refer to a plurality of PB pictures. Accordingly, an additional data value in the PA picture, the number of PB pictures, and the number of PC pictures may be different.

Figure 3C:
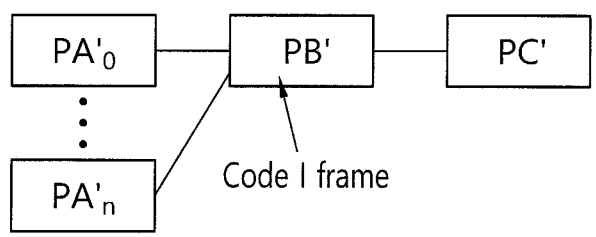
FIG. 3C is a schematic diagram showing the relationship between different additional data PA' picture and intra-coded PB' picture and a PC picture.

FIG. 3C is a schematic diagram showing the relationship between different additional data PA' picture and intra-coded PB' picture and a PC picture.

Referring to FIG. 3C, an I frame of the PB' picture may be coded. In some embodiments, as described above, a B or P frame of the PB' picture may be intra-coded. In this case, the PB' picture may not have a reference relationship. Although very many types (e.g., 0 to n) of additional data are added to a PA picture, the PA picture does not always have a reference relationship with the PB' picture transformed and coded by intra-coding and the PC picture, but may be combined with the PB' picture transformed and coded by intra-coding and the PC picture to form a bitstream.

Figure 4:
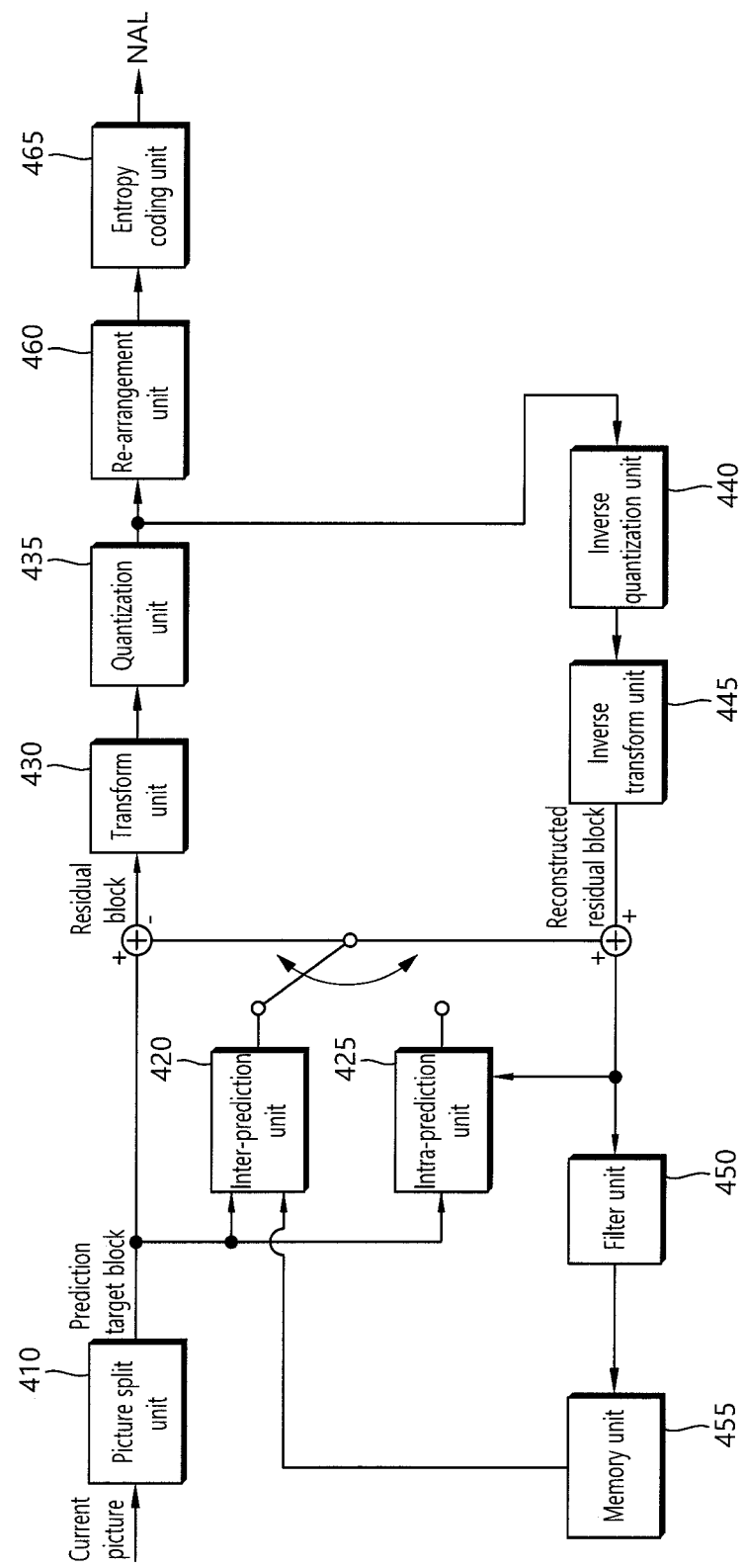
FIG. 4 is a block diagram showing a configuration for processing a transformed and coded PB picture in the method for inserting additional data according to an embodiment of the present invention.

FIG. 4 is a block diagram showing a configuration for processing a transformed and coded PB picture in the method for inserting additional data according to an embodiment of the present invention. As shown in FIG. 4, elements for transforming and coding according to an embodiment of the present invention may include a picture split unit 410, an inter-prediction unit 420, an intra-prediction unit 425, a transform unit 430, a quantization unit 435, an inverse quantization unit 440, an inverse transform unit 445, a filter unit 450, a memory unit 455, a re-arrangement unit 460, and a entropy coding unit 465.

The picture split unit 410 may split an inputted current picture (e.g., a PB picture) into one or more coding units. A coding block (hereinafter called a "CB") is a single unit on which coding is performed in a video encoder. The CB has depth information based on a quad tree structure and may be split hierarchically. The CB may have various sizes, such as 8×8, 16×16, 32×32, and 64×64. A CB having the largest size may be called a Largest Coding Block (LCB), and a CB having the smallest size may be called a Smallest Coding Block (SCB).

Furthermore, the picture split unit 410 may generate a Prediction Block (hereinafter called a "PB") and a Transform Block (hereinafter called a "TB") by splitting a CB. The PB may be a block smaller than or equal to the CB. The PB does not need to be necessarily a square, but may be a rectangular block.

In general, intra-prediction may be performed in a block unit of a 2N*2N or N*N size. In this case, N is a natural number and is indicative of the number pixels. 2N*2N and N*N may be indicative the size (and/or split mode) of a PB. In a Short Distance Intra Prediction (SDIP) method, however, in order to improve efficiency of intra-prediction, hN*2N/2N*hN, that is, subdivided prediction block sizes, may be used in addition to a prediction block of 2N*2N. In this case, h=½. If a prediction unit of an hN*2N/2N*hN size is used, the directivity of a boundary surface within a block may be incorporated further well. Accordingly, the number of bits for coding can be reduced because energy of a prediction error signal is reduced, thereby being capable of improving coding efficiency.

Furthermore, inter-prediction may be performed in a block unit of a 2N*2N, 2N*N, N*2N, or N*N size. In this case, N is a natural number and is indicative of the number of pixels. 2N*2N, 2N*N, N*2N, and N*N may be indicative of the size (and/or split mode) of a PB. Furthermore, in inter-prediction, in order to improve efficiency of inter-prediction, prediction may be performed in a prediction block unit of 2N×nU, 2N×nD, nL×2N, or nR×2N in addition to the prediction block of 2N*2N, 2N*N, N*2N, or N*N. In this case, 2N×nU, 2N×nD, nL×2N, and nR×2N may be indicative of the size (and/or split mode) of a PB. In 2N×nU or 2N×nD split mode, the size of a PB may be 2N×(½)N or 2N×(3/2)N. In nL×2N or nR×2N split mode, the size of a PB may be (½)N×2N or (3/2)N×2N.

In inter-prediction mode, the inter-prediction unit 420 may perform Motion Estimation (ME) and Motion Compensation (MC). The inter-prediction unit 420 may generate a prediction block based on information about at least one of pictures anterior or posterior to a current picture. In this case, the previous picture may be a PA' picture into which additional data has been inserted. In some embodiments, a PA picture may be provided as a reference picture in order to perform a comparison with the PA picture.

The inter-prediction unit 420 may perform motion estimation based on split prediction target blocks and at least one reference block (e.g., the reference block of a PA' picture) stored in the memory unit 455. That is, data related to a PA' picture into which additional data has been newly inserted may have been stored in the memory unit 455. The inter-prediction unit 420 may generate motion information, including a Motion Vector (MV), a reference block index, and prediction mode as the results of the motion estimation.

Furthermore, the inter-prediction unit 420 may perform motion compensation using motion information and a reference block. In this case, the inter-prediction unit 420 may generate a prediction block corresponding to an input block from the reference block and output the generated prediction block.

In intra-prediction mode, the intra-prediction unit 425 may generate a prediction block based on information about pixels within a current picture. In intra-prediction mode, the intra-prediction unit 425 may perform prediction on a current block based on a prediction target block and a restoration block reconstructed after being previously transformed and quantized. The restoration block may be an image reconstructed before experiencing the filter unit 450. In accordance with an embodiment of the present invention, the intra-prediction unit 425 may encode the first frame of a PB picture into an I frame through intra-prediction. In this case, reference relationships between PB pictures other than the first frame coded into the I frame may be changed so that direct and indirect reference is newly made to the coded I frame instead of reference to an existing PA picture.

As described above, in inter-mode or intra-mode, prediction may be performed on a prediction target block, and a prediction block may be generated. In this case, a residual block may be generated based on a difference between the prediction target block and the generated prediction block.

The transform unit 430 may generate a transform coefficient by performing transform on a residual block for each TB. A TB may have a tree structure within a range of a maximum size and a minimum size. Whether a current block is divided into sub-blocks may be indicated by a flag for each TB. The transform unit 430 may perform transform based on Discrete Cosine Transform (DCT) and/or Discrete Sine Transform (DST).

The quantization unit 435 may quantize values transformed by the transform unit 430. A quantization coefficient may be changed depending on a block or the importance of an image. The quantized transform coefficient values may be provided to the re-arrangement unit 460 and the inverse quantization unit 440.

The re-arrangement unit 460 may arrange the quantized transform coefficients of a two-dimensional block form into transform coefficients of a 1-dimensional vector form in order to improve entropy coding efficiency through scanning. In this case, the re-arrangement unit 460 may improve entropy coding efficiency by making different a scan sequence based on probabilistic statistics.

The entropy coding unit 465 may perform entropy coding on values obtained by the re-arrangement unit 460. In an entropy coding process, a codeword having a less number of bits may be assigned to a syntax element value having higher frequency of occurrence, and a codeword having a more number of bits may be assigned to a syntax element value having lower frequency of occurrence. Accordingly, image coding compression performance can be improved because the size of a bit string for coding target symbols is reduced. For entropy coding purposes, coding schemes, such as exponential Golomb, Context-Adaptive Variable Length Coding (CAVLC) and/or Context-Adaptive Binary Arithmetic Coding (CABAC), may be used. Pieces of coded information form a compressed bitstream and may be transmitted through a Network Abstraction Layer (NAL) or may be stored.

The inverse quantization unit 440 may perform inverse quantization on transform coefficients quantized by the quantization unit 435. The inverse transform unit 445 may generate a reconstructed residual block by inversely transforming the inversely quantized transform coefficients. The reconstructed residual block may be combined with a prediction block generated by the inter-prediction unit 420 or the intra-prediction unit 425, so a restoration block may be generated. The restoration block may be provided to the intra-prediction unit 425 and the filter unit 450.

The filter unit 450 may apply a deblocking filter, a Sample Adaptive Offset (SAO) and/or an Adaptive Loop Filter (ALF) to a reconstructed residual block. The deblocking filter may filter a restoration block in order to remove a distortion between block boundaries, which is generated in coding and decoding processes. The SAO is a loop filter processing process for restoring an offset difference with the original image in a pixel unit with respect to a residual block to which the deblocking filter has been applied. An offset used in the SAO may include a band offset and an edge offset. In the band offset, a pixel may be divided into 32 bands according to intensity, the 32 bands may be divided into two band groups of edge 16 bands and center 16 bands, and the band offset may be applied. The ALF may perform filtering in order to minimize an error between a prediction target block and the final reconstructed block. The ALF may perform filtering based on a value obtained by comparing a restoration block, filtered through the deblocking filter, with a current prediction target block. Filter coefficient information of the ALF may be loaded onto a slice header and transmitted from an encoder to a decoder.

The memory unit 455 may store the final reconstructed block that has experienced the filter unit 450. The stored final reconstructed block may be provided to the inter-prediction unit 420 which performs inter-prediction.

In accordance with an embodiment of the present invention, the inter-prediction unit 420 of the aforementioned elements may perform inter-prediction with a PB picture with reference to a PA' picture into which additional data has been inserted. The inter-prediction unit 420 may generate a transformed and coded PB' picture, having a decoding result value at which the original PB picture can be output, with reference to the PA' picture generally through a residual block generated in this case. The generated residual block may be generated in the form of a Network Abstraction Layer (NAL) unit through the transform unit 430, the quantization unit 435, the re-arrangement unit 460, and the entropy coding unit 465.

Figure 5:
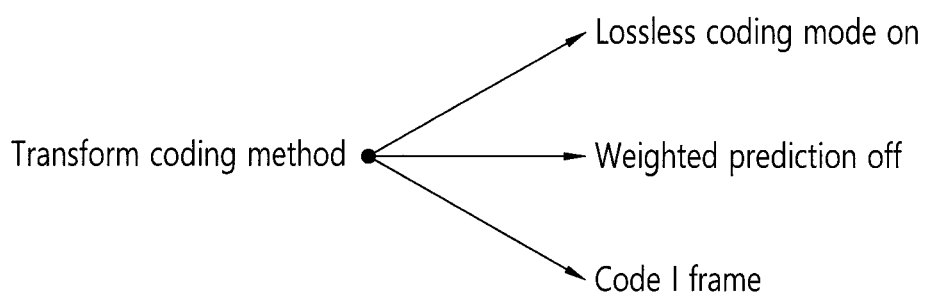
FIG. 5 is a diagram showing options which may be taken into consideration when transforming and coding are performed in the method for inserting additional data according to an embodiment of the present invention.

FIG. 5 is a diagram showing options which may be taken into consideration when transforming and coding are performed in the method for inserting additional data according to an embodiment of the present invention.

Referring to FIG. 5, in accordance with a first embodiment of the present invention, when a PB picture is modified and coded, lossless coding mode may be used. In this case, a PB' picture not having damage to picture quality can be generated.

Furthermore, in accordance with a second embodiment of the present invention, a PB picture may be generated into a transformed and coded PB' picture with weighted prediction off. Accordingly, multiplication operation in weight which may deteriorate damage to picture quality when coding is performed can be excluded.

Furthermore, in accordance with a third embodiment of the present invention, a method of improving coding efficiency of a PB picture by coding the first picture of a PB picture set into an I frame or I slice may be used.

Figure 6:
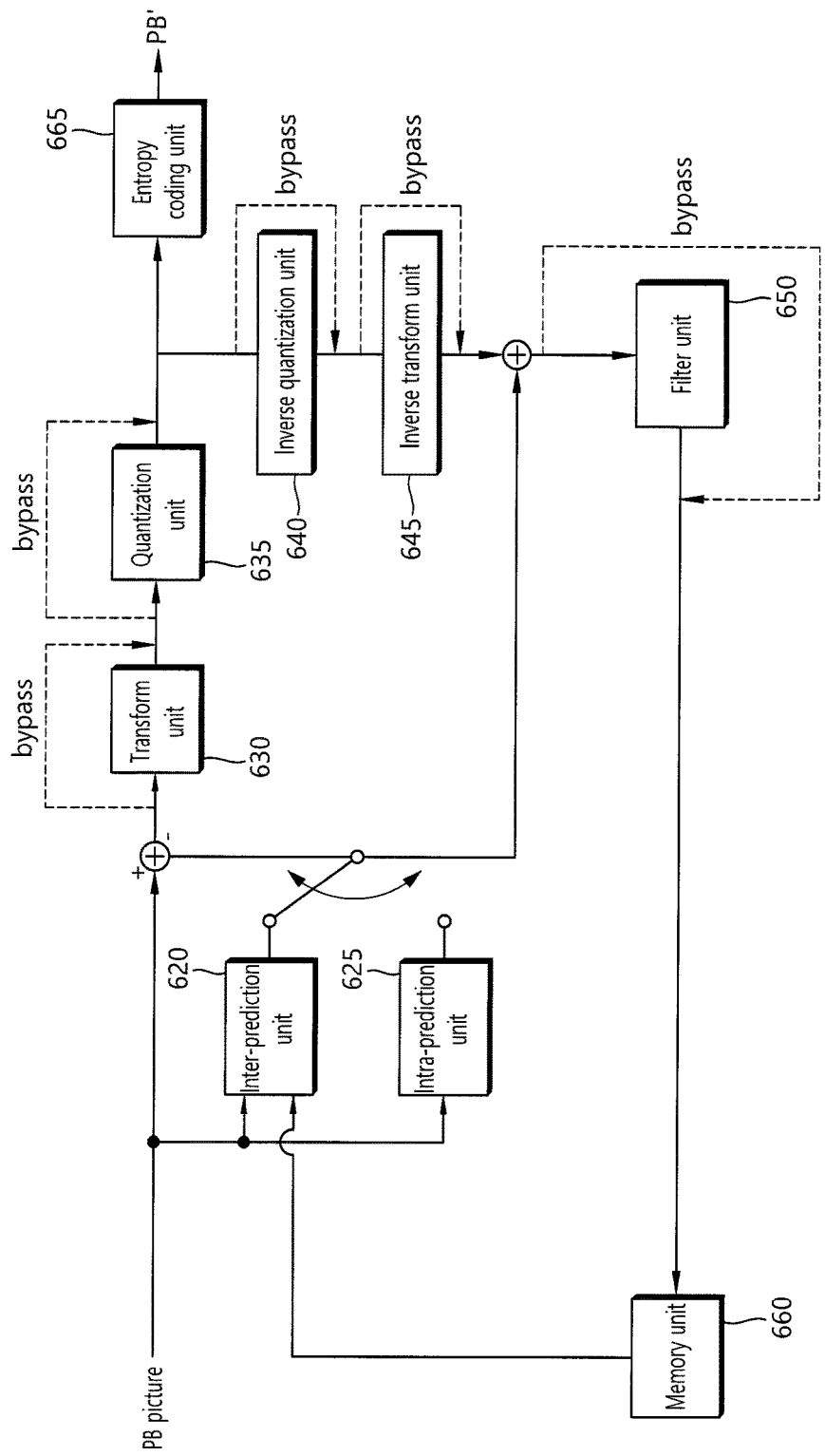
FIG. 6 is a diagram showing the operation of each of elements according to a lossless method when transforming and coding are performed.

FIG. 6 is a diagram showing the operation of each of elements according to a lossless method when transforming and coding are performed. As shown in FIG. 6, the elements for transforming and coding according to a lossless method may basically correspond to the elements of FIG. 4 and may also have functions corresponding to those of the elements of FIG. 4.

Referring to FIG. 6, in transforming and coding to the PB' picture of a PB picture, to use lossless coding may be preferred. In the lossless coding, an encoder bypasses transform and quantization. Furthermore, sample based angular intra-prediction (SAP) may be added in order to improve efficiency of lossless mode without transform and quantization. SAP may be replaced with a common angular intra-prediction method. That is, after a residual block is generated through all the functions of the transform unit 630, the quantization unit 635, the inverse quantization unit 640, and the inverse transform unit 645 of FIG. 6, the PB' picture may be formed by performing entropy coding.

Furthermore, when lossless mode is applied, all of in-loop filtering operations in the filter unit 650 may be bypassed. Since distortion present within a frame reconfigured in lossless mode is inevitably present, the in-loop filtering operation does not help any of picture quality and coding efficiency.

That is, in the entire coding loop, the PB picture may be completely reconstructed by bypassing some of or all of transform, quantization, inverse transform, inverse quantization, and in-loop filtering portions.

Figure 7:
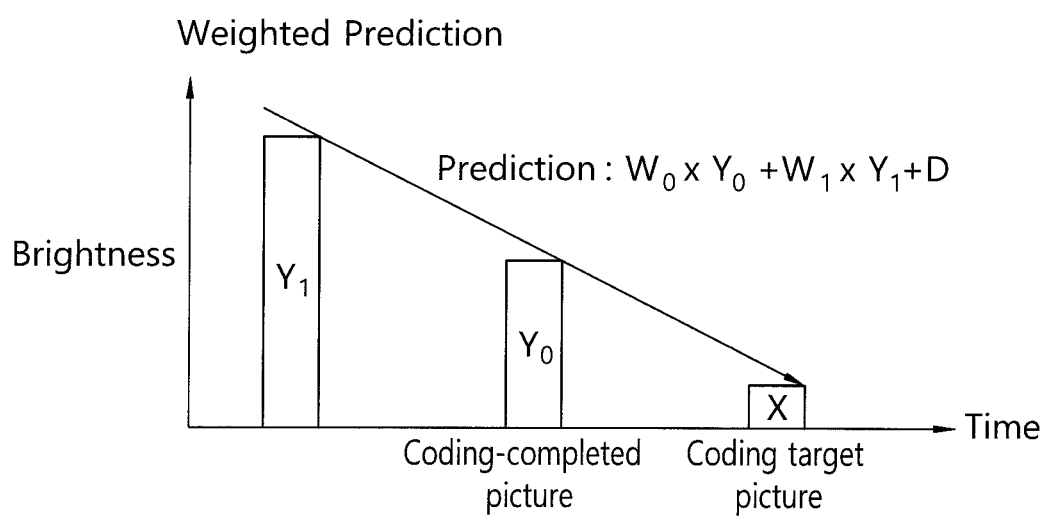
FIG. 7 illustrates an operation for illustrating options according to weighted prediction when transforming and coding are performed.

FIG. 7 illustrates an operation for illustrating options according to weighted prediction when transforming and coding are performed.

The transforming and coding of the original PB picture may be performed in a P frame or B frame. Weighted prediction is an algorithm for predicting the brightness of a moving image coding method. That is, the algorithm is for preventing the deterioration of picture quality of an image whose brightness is temporally changed, such as fade out/fade in, when coding the image.

In this case, in the case of a P frame including only one L0 frame, a prediction signal $Y_0$ is multiplied by a weight coefficient $W_O$, offset weight D is added to the prediction signal, and the prediction signal is transmitted.

In the case of a B frame, as shown in FIG. 7, a method of performing accurate prediction by multiplying prediction signals $Y_0$ and $Y_1$ by weight coefficients $W_O$ and $W_1$ and adding offset weight D to the prediction signals in order to correct brightness may be used.

In accordance with an embodiment of the present invention, however, in transforming and coding for the PB' picture of a PB picture, weighted prediction mode is made off when weighted prediction is performed. In this case, a loss of picture quality or the expansion of an error range attributable to the execution of multiplication operation can be prevented, and a damage prevention picture can be generated. That is, a multiplication operation part may switch to addition operation in order to remove a part multiplied by weight coefficient.

Figure 8:
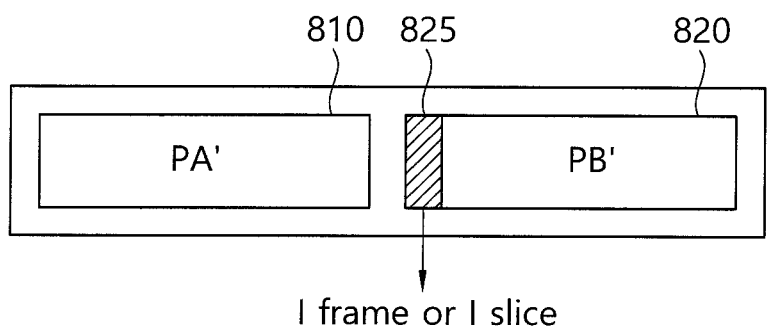
FIG. 8 is a diagram illustrating a method for inserting an I frame or I slice into a PB picture when transforming and coding are performed.

FIG. 8 is a diagram illustrating a method for inserting an I frame or I slice into a PB picture when transforming and coding are performed.

Referring to FIG. 8, in generating a transformed and coded PB' picture 820 based on a PA' pictures 810, the first picture or slice 825 of the PB' picture 820 may be coded into an I frame or I slice. In the PB' picture, the number of frames generated into the I frame does not need to be necessarily 1. For example, 1 to n (n is a natural number) frames may be coded into an I frame.

This is for improving coding efficiency of the PB' pictures 820 that are newly transformed and coded. The first picture 825 (or a plurality of pictures subsequent to the first picture) may be coded into an I frame through the intra-prediction unit (refer to 425 and 625 of FIGS. 4 and 6).

After the I frame is generated, a reference relationship may be changed so that reference are directly and indirectly made to the I frame in which P and B frames within the PB' picture 820 have been newly generated, and the PB picture may be coded.

Furthermore, in accordance with another embodiment of the present invention, some region (e.g., some Coding Blocks (CBs)) of the B or P frame included in the PB picture may be intra-coded. That is, the entire B or P frame included in the PB picture may be intra-coded into the I frame or only some region (e.g., some CBs) of the B or P frame may be selected and intra-coded.

FIG. 9 is a schematic block diagram showing an apparatus for inserting additional data according to an embodiment of the present invention. As shown in FIG. 9, the apparatus for inserting additional data according to an embodiment of the present invention may include a bitstream input unit 910, a first picture selection unit 920, an additional data insertion unit 925, a second picture selection unit 930, a transform and coding unit 940, and a data sequence generation unit 950.

Referring to FIG. 9, the bitstream input unit 910 receives bitstream data into which information will be inserted. As described above, the bitstream data may be data prior to coding or may be already coded data. If the bitstream data is already coded data, when additional data is inserted into the coded data, minimum re-encoding may be performed. In accordance with an embodiment of the present invention, the insertion of the additional data and corresponding re-encoding may be performed in a GOP unit. That is, the bitstream input unit 910 may cut a target into which additional data will be inserted in a GOP unit and input the additional data into the target.

The first picture selection unit 920 selects a PA picture, that is, a target into which additional data will be inserted, from the bitstream. The additional data may include a watermark, a user ID, copyright-related information, or other encryption data.

The additional data insertion unit 925 may receive the PA picture selected by the first picture selection unit 920 and insert the additional data, such as a watermark, into the PA picture. The additional data insertion unit 925 may insert the additional data into a position which has been previously set by default or determined by a user interface. A picture into which the information has been inserted may become a PA' picture.

The second picture selection unit 930 receives data regarding the PA picture selected by the first picture selection unit 920 and selects a PB picture that belongs to the received bitstream and that directly refers to the PA picture. The PB picture may include a B frame in addition to a P frame. The B frame may refer to a third picture, that is, a PC picture other than the PA and the PB pictures except the B frame included in the PA' picture.

The transform and coding unit 940 generates a transformed and coded PB' picture, having a decoding result value at which the original PB picture can be produced, with reference to the PA' picture into which the additional data has been inserted with respect to the PB picture selected by the second picture selection unit 930. The transform and coding unit 940 may generate the transformed and coded PB' picture using a coding scheme, such as H.265, H.264 and/or H.263, based on a reference picture and the result decoding value because the reference picture is the PA' picture and the decoding result value needs to be the original PB picture value. The transform and coding unit 940 may generate the transformed and coded PB' picture based on the PA' picture into which the additional data has been inserted and the original PA picture using the selected pictures PB according to a lossless method. Alternatively, elements for weighted prediction may be off, multiplication operation may be changed to addition operation, and transforming and coding may be performed. Furthermore, the transform and coding unit 940 may code the first frame or slice of the transformed and coded PB' picture set into an I frame or I slice through intra-prediction. After the intra-coding into the I frame or the I slice, reference may be made to the I frame or the I slice directly and indirectly in the reference relationship between the remaining PB pictures.

The PB' picture generated as described above can offset the additional coding of all of other pictures (e.g., PC pictures) within the bitstream other than the PA picture, that is, a target into which the additional data will be inserted, and the PB picture and can prevent damage to picture quality and a reduction of coding efficiency attributable to the coding of information inserted into the PA picture.

If the PA' picture into which the additional data has been inserted and the transformed and coded PB' picture have been obtained and the remaining PC pictures have already been coded, a separate task is not required because transmission has only to be performed without a special replacement. Accordingly, the data sequence generation unit 950 may generate a data sequence by collecting the PA' and the PB' pictures actually re-encoded by the transform and coding unit 940 and the additional data insertion unit 925. Only the PA' picture and PB' picture sequence that is newly coded in the original bitstream has only to be changed when data is generally replaced.

In other words, the data sequence generated as described above may be integrated with existing data (e.g., the bitstream data of another picture set (i.e., PC pictures) other than the PA picture and the PB picture) and transmitted to the reception side.

In accordance with the method and apparatus for inserting additional data into a moving image stream for preventing damage to picture quality according to the embodiments of the present invention, there is an advantage in that coding efficiency of an encoder can be improved because an additional coding task can be minimized when additional data is inserted into a specific picture.

Furthermore, additional data, such as a watermark, can be coded without being greatly influenced by the size of the additional data. Accordingly, there is an advantage in that efficiency can be improved in terms of the protection of digital content because a limit to the size or form of a watermark inserted into the digital content is reduced.

While the invention has been shown and described with respect to the preferred embodiments, it will be understood by those skilled in the art that various changes and transforms may be made without departing from the spirit and scope of the invention as defined in the following claims.

What is claimed is:

1. A method of inserting additional data into a moving image stream, the method comprising:
    receiving a coded bitstream;
    selecting a first coded picture (PA) among the received coded bitstream,
        wherein the additional data is to be inserted into the selected first coded picture (PA);
    generating a first additional data inserted picture (PA') by inserting the additional data into the selected first coded picture (PA);
    selecting a second coded picture (PB) among the received coded bitstream,
        wherein the second coded picture (PB) directly refers to the first coded picture (PA);
    generating a second re-coded picture (PB'),
        wherein the generated second re-coded picture (PB') is decoded by referring to the first additional data inserted picture (PA'); and
        wherein the decoded second picture (PB') is same as the second coded picture (PB); and
    generating a data sequence based on the first additional data inserted picture (PA') and the second re-coded picture (PB').

2. The method according to claim 1, wherein the generating the second re-coded picture (PB') includes generating the second re-coded picture (PB') based on the first additional data inserted picture (PA') and the first coded picture (PA).

3. The method according to claim 1, wherein a third picture PC other than the first coded picture (PA) and the second coded picture (PB) in the bitstream is without an additional coding from the insertion of the additional data into the first coded picture (PA).

4. The method according to claim 1, wherein the second coded picture (PB) comprises a B frame or a P frame, directly referring to the first coded picture (PA).

5. The method according to claim 1, wherein the additional data comprises a watermark data.

6. The method according to claim 1, wherein the generating the second re-coded picture (PB') is performed based on a lossless coding scheme.

7. The method according to claim 1, wherein the generating the second re-coded picture (PB') is performed with a weighted prediction off.

8. The method according to claim 1, wherein the generating the second re-coded picture (PB') further includes coding a first frame of the second re-coded picture (PB') into an I frame.

9. The method according to claim 1, wherein m types of the second re-coded picture (PB') correspond to the first additional data inserted picture (PA') into which n types of additional data differently generated depending on types of inserted additional data have been inserted, where m and n are natural numbers equal to or different from each other.

10. The method according to claim 9, wherein
    when the second re-coded picture (PB') is transformed and coded based on a lossless scheme, the second re-coded picture (PB') is allowed to refer to the first additional data inserted picture (PA'), and
    when the second re-coded picture (PB') is coded based on an intra-coding scheme, the first additional data inserted picture (PA') into which the n types of additional data have been inserted corresponds to one of the n types of the second re-coded picture (PB').

11. An apparatus for inserting additional data into a moving image stream, the apparatus comprising:
    a bitstream input unit configured to receive a coded bitstream;
    a first picture selection unit configured to select a first coded picture (PA) among the received coded bitstream,
        wherein the additional data is to be inserted into the selected first coded picture (PA);
    an additional data insertion unit configured to generate a first additional data inserted picture (PA') by inserting the additional data into the selected first coded picture (PA);

a second picture selection unit configured to select a second coded picture (PB) among the received coded bitstream, wherein the second coded picture (PB) directly refers to the first picture (PA);

a transform and coding unit configured to generate a re-coded picture (PB'), wherein the generated second re-coded picture (PB') is decoded by referring to the first additional data inserted picture (PA'), and wherein the decoded second picture (PB') is same as the second coded picture (PB); and a data sequence generation unit configured to generate a data sequence based on the first additional data inserted picture (PA') and the second re-coded picture (PB').

12. The apparatus according to claim 11, wherein the transform and coding unit generates the second re-coded picture (PB') includes generating the second re-coded picture (PB') based on the first additional data inserted picture (PA') and the first coded picture (PA).

13. The apparatus according to claim 11, wherein a third picture PC other than the first coded picture (PA) and the second coded picture (PB) in the bitstream is without an additional coding from the insertion of the additional data into the first coded picture (PA).

14. The apparatus according to claim 11, wherein the second coded picture (PB) comprises a B frame or a P frame, directly referring to the first coded picture (PA).

15. The apparatus according to claim 11, wherein the additional data comprises a watermark data.

16. The apparatus according to claim 11, wherein the transform and coding unit generates the second re-coded picture (PB') based on a lossless coding scheme.

17. The apparatus according to claim 11, wherein the second re-coded picture (PB') is generated with a weighted prediction off.

18. The apparatus according to claim 11, wherein the transform and coding unit codes a first frame of the second re-coded picture (PB') into an I frame.

19. The apparatus according to claim 11, wherein m types of the second re-coded picture (PB') correspond to the first additional data inserted picture (PA') into which n types of additional data differently generated depending on types of inserted additional data have been inserted, where m and n are natural numbers equal to or different from each other.

20. The apparatus according to claim 19, wherein:

when the second re-coded picture (PB') is transformed and coded based on a lossless scheme, the second re-coded picture (PB') is allowed to refer to the first additional data inserted picture (PA'), and when the second re-coded picture (PB') is coded based on an intra-coding scheme, the first additional data inserted picture (PA') into which the n types of additional data have been inserted corresponds to one of the n types of the second re-coded picture (PB').

* * * * *